US010484202B2

(12) United States Patent
Osada et al.

(10) Patent No.: US 10,484,202 B2
(45) Date of Patent: Nov. 19, 2019

(54) RELAY DEVICE, ELECTRONIC CONTROL DEVICE, AND VEHICLE-MOUNTED NETWORK SYSTEM

(71) Applicant: HITACHI AUTOMOTIVE SYSTEMS, LTD., Hitachinaka-shi, Ibaraki (JP)

(72) Inventors: Kenichi Osada, Ibaraki (JP); Kenichi Kurosawa, Ibaraki (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 0 days.

(21) Appl. No.: 15/768,733

(22) PCT Filed: Oct. 17, 2016

(86) PCT No.: PCT/JP2016/080635
§ 371 (c)(1),
(2) Date: Apr. 16, 2018

(87) PCT Pub. No.: WO2017/077841
PCT Pub. Date: May 11, 2017

(65) Prior Publication Data
US 2018/0287816 A1    Oct. 4, 2018

(30) Foreign Application Priority Data

Nov. 5, 2015 (JP) .................... 2015-217200

(51) Int. Cl.
*H04L 12/46* (2006.01)
*H04L 12/40* (2006.01)
(52) U.S. Cl.
CPC .... *H04L 12/4608* (2013.01); *H04L 12/40006* (2013.01); *H04L 12/40176* (2013.01);
(Continued)

(58) Field of Classification Search
CPC .......... H04L 12/4608; H04L 12/40176; H04L 12/46; H04L 2012/40273; H04L 2012/40215; H04L 12/56
See application file for complete search history.

(56) References Cited

U.S. PATENT DOCUMENTS 5,414,708 A * 5/1995 Webber .................. H04L 12/44
                                                  370/445
5,835,710 A * 11/1998 Nagami .............. H04L 12/4608
                                                  709/250
(Continued)

FOREIGN PATENT DOCUMENTS

JP    2005-045521 A    2/2005
JP    2006-287738 A    10/2006
(Continued)

OTHER PUBLICATIONS

International Search Report with English translation and Written Opinion issued in corresponding application No. PCT/JP2016/080635 dated Jan. 24, 2017.

*Primary Examiner* — Sharad Rampuria
(74) *Attorney, Agent, or Firm* — Foley & Lardner LLP (57) ABSTRACT

Provided are a relay device and the like with which it is possible to suppress bus signal reflections and suppress signal delays. A relay device 100A includes a signal processing and forwarding pathway P1 and a bypass connection pathway P2. The signal processing and forwarding pathway P1 processes a signal received from one bus CAN1 of a plurality of buses, and forwards the processed signal to another bus CAN2. The bypass connection pathway P2 connects the one bus CAN1 to the other bus CAN2, bypassing the signal processing and forwarding pathway P1.

9 Claims, 4 Drawing Sheets (52) U.S. Cl.
CPC ............... *H04L 2012/40215* (2013.01); *H04L 2012/40273* (2013.01)

(56) References Cited

U.S. PATENT DOCUMENTS

| | | | | |
|---|---|---|---|---|
| 5,946,321 | A * | 8/1999 | Dean | H04L 12/46 370/403 |
| 7,136,475 | B1 * | 11/2006 | Rogers | H04M 3/436 379/213.01 |
| 2014/0241370 | A1 * | 8/2014 | Itou | H04L 45/44 370/396 |
| 2017/0064623 | A1 * | 3/2017 | Sekiya | H04W 52/0206 |

FOREIGN PATENT DOCUMENTS

| | | |
|---|---|---|
| JP | 2014-165746 A | 9/2014 |
| JP | 2015-088941 A | 5/2015 |

* cited by examiner

| PHASE | CAN1 | CAN2 | CONNECTION CIRCUIT 102,103 | BUFFER CIRCUIT 104 | BUFFER CIRCUIT 105 |
|---|---|---|---|---|---|
| ARBITRATION | TRANSMISSION AND RECEPTION | TRANSMISSION AND RECEPTION | ON | OFF | OFF |
| DATA | TRANSMISSION | RECEPTION | OFF | ON(CANH1→CANH2) | ON(CANL1→CANL2) |
| | RECEPTION | TRANSMISSION | OFF | ON(CANH2→CANH1) | ON(CANL2→CANL1) |

| PHASE | CAN1 | CAN2 | CONNECTION CIRCUIT 102, 103 | OUTPUT OF DRIVER CIRCUIT 107 | OUTPUT OF DRIVER CIRCUIT 106 | SWITCH CIRCUIT 131, 132 |
|---|---|---|---|---|---|---|
| ARBITRATION | TRANSMISSION AND RECEPTION | TRANSMISSION AND RECEPTION | ON | OFF | OFF | OFF |
| DATA | TRANSMISSION | RECEPTION | OFF | ON | OFF | ON |
| | RECEPTION | TRANSMISSION | OFF | OFF | ON | ON |

| PHASE | | CAN1 | CAN2 | CONNECTION CIRCUIT 102,103 | TRANSISTOR PMOS1 NMOS1 | TRANSISTOR PMOS2 NMOS2 | SWITCH CIRCUIT 131,132 |
|---|---|---|---|---|---|---|---|
| ARBITRATION | | TRANSMISSION AND RECEPTION | TRANSMISSION AND RECEPTION | ON | OFF | OFF | OFF |
| DATA | | TRANSMISSION | RECEPTION | OFF | OFF | ON | ON |
| | | RECEPTION | TRANSMISSION | OFF | ON | OFF | ON |

FIG. 5

RELAY DEVICE, ELECTRONIC CONTROL DEVICE, AND VEHICLE-MOUNTED NETWORK SYSTEM

TECHNICAL FIELD

The present invention relates to a relay device, an electronic control device, and a vehicle-mounted network system.

BACKGROUND ART

Traffic of a vehicle-mounted network has increased due to the advancement of a safe driving support or an automatic driving technology. To cope with these problems, a CAN with flexible data rate (CAN FD) communication system which can increase a data transmission rate and extend a data length has been known. In the CAN FD, nodes which perform transmission and reception are generally electronic control units (ECUs), and each node is electrically connected by a bus. A transmitting ECU adds an identifier (ID) to communication data to construct a message, converts the message into an electric signal, and transmits the electric signal on the bus. Each ECU monitors the electric signal on the bus, acquires the ID during the communication, and specifies the message to be received.

When a plurality of messages are transmitted at the same time, priority of communication is determined according to the ID. A phase of determining the ECU which can transmit the ID and transmit the message according to the priority is called an arbitration (adjustment) phase. In the arbitration phase, the plurality of ECUs perform communication at the same rate as the conventional CAN, for example, at 500 kbps for simultaneous output. After the ECU which transmits the message is determined by the arbitration, the arbitration phase becomes a data phase for transmitting data. In the data phase in which the number of ECUs outputting the message is specified to be one, the transmission rate is 2 Mbps, for example.

However, there is a problem in that if a communication rate is increased to 2 Mbps in the conventional network configuration which can communicate at 500 kbps, data are not correctly transmitted due to reflection. As a method to solve these problems, it is effective to divide buses and reduce a scale of a network of each bus (reduce the number of connected nodes and reduce a length of harness (wiring)). However, in this case, there arises a problem in that the number of ECUs that can perform communication at the same time is reduced. In such a case, a method of using a gateway ECU to connect divided buses has been known (for example, see PTL 1). The gateway ECU transmits data received from one bus to the other bus. It is possible to perform the communication between the ECUs connected to buses divided into two by using the technique disclosed in PTL 1.

CITATION LIST

Patent Literature

PTL 1: JP 2015-088941 A

SUMMARY OF INVENTION

Technical Problem

In the technique disclosed in PTL 1, data are temporarily transmitted from the ECU connected to one bus to the gateway ECU, and then transmitted from the gateway ECU to an ECU connected to another bus. For this reason, the communication time is increased as compared with the case in which ECUs connected to a single network communicate with each other.

An object of the present invention is to provide a relay device and the like capable of suppressing bus signal reflections and suppressing signal delays.

Solution to Problem

To achieve the above-described object, the present invention is a relay device which relays a plurality of buses to which a plurality of vehicle-mounted processing devices are connected, and includes: a signal processing and forwarding pathway which processes a signal received from one of the plurality of buses and forwards the signal to another bus; and a bypass connection pathway which connects the one bus to the other bus, bypassing the signal processing and forwarding pathway.

Advantageous Effects of Invention

According to the present invention, it is possible to suppress the bus signal reflections and to suppress the signal delays. Other problems, structures, and effects other than the above are clarified from the description of the following embodiments.

DESCRIPTION OF EMBODIMENTS

Hereinafter, configurations and operations of a relay circuit (relay device) according to first to third embodiments of the present invention will be described with reference to the drawings. In each figure, the same reference numerals denote the same parts.

First Embodiment

Figure 1A:
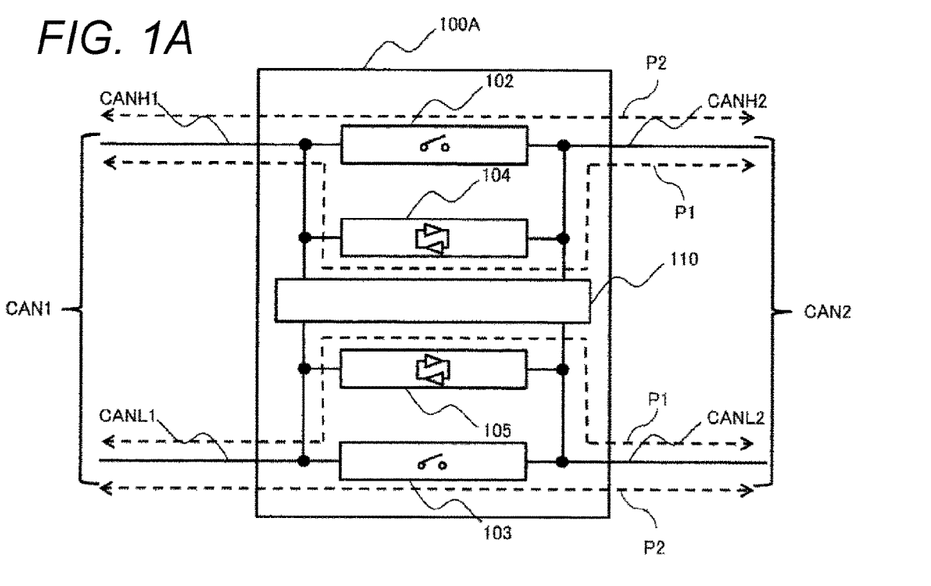
FIG. 1A is a block diagram of a relay circuit according to a first embodiment.

According to a first embodiment, a relay circuit 100A to which two pairs of buses (CAN1 and CAN2) shown in FIG. 1A are connected is configured. A pair of buses CAN1 is configured to include two buses (CANH1 and CANL1) and the other pair of buses CAN2 is configured to include two buses (CANH2 and CANL2). The bus CANH1 is connected to the bus CANH2 via a connection circuit 102 and a buffer circuit 104. The bus CANL1 is connected to the bus CANL2 via a connection circuit 103 and a buffer circuit 105. The connection circuits (102 and 103) are switches which electrically, directly and conductively connect the buses.

In FIG. 1A, although the relay circuit 100A relays the bus CAN1 and the bus CAN2, it goes without saying that a plurality of buses to which a plurality of vehicle-mounted processing devices are connected may be relayed. In other words, the plurality of buses at least include the bus CAN1 (first bus) and the bus CAN2 (second bus).

As shown in FIG. 1A, the relay device 100A has a signal processing and forwarding pathway P1 and a bypass connection pathway P2. The signal processing and forwarding pathway P1 processes a signal received from one bus CAN1 of the plurality of buses and forwards the processed signal to the other bus CAN2. The bypass connection pathway P2 connects one bus CAN1 to the other bus CAN2, bypassing the signal processing and forwarding pathway P1.

In detail, the bypass connection pathway P2 includes the connection circuits 102 and 103 (switches) whose one end is connected to the bus CAN1 (first bus) and the other end is connected to the bus CAN2 (second bus).

The buffer circuit 104 receives a value of the bus CANH1 and outputs the same value to the bus CANH2 or receives a value of the bus CANH2 and outputs the same value to the bus CANH1. The buffer circuit 105 receives a value of the bus CANL1 and outputs the same value to the bus CANL2 or receives a value of the bus CANL2 and outputs the same value to the bus CANL1. That is, a logical value of the signal input to the buffer circuits (104 and 105) and a logical value of the signal output from the buffer circuits (104 and 105) are the same.

In other words, as shown in FIG. 1A, the signal processing and forwarding pathway P1 includes the buffer circuits 104 and 105 (first communication device) which transmit an output signal generated based on the first signal received from the bus CAN1 (first bus) to the bus CAN2 (second bus). In addition, the signal processing and forwarding pathway P1 includes the buffer circuits 104 and 105 (second communication device) which transmit an output signal generated based on the second signal received from the bus CAN2 (second bus) to the bus CAN1 (first bus). In the present embodiment, the first communication device and the second communication device may be configured integrally or separately.

Figure 5:
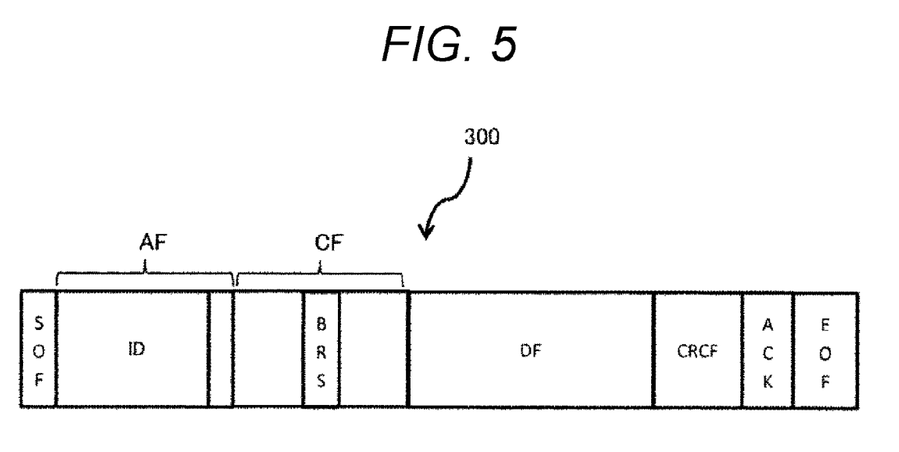
FIG. 5 is a diagram showing an example of a frame configuration.

The first signal and the second signal include a frame 300 shown in FIG. 5. The frame 300 is configured to include, for example, a start of frame (SOF), an arbitration field (AF), a control field (CF), a CRC field (CRCF), ACK, an end of frame (EOF). The arbitration field AF includes an ID, and the control field CF includes a BRS bit.

Figure 2:
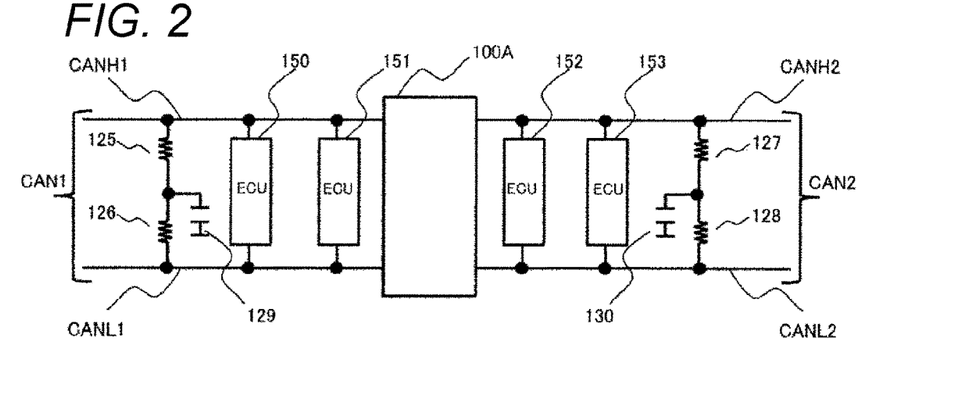
FIG. 2 is a diagram showing a configuration of a vehicle-mounted network according to the first embodiment.

FIG. 2 shows a network configuration to which the relay circuit is applied. Vehicle-mounted electronic control units (ECU) (150 and 151) are connected to the bus CAN1, and vehicle-mounted ECUs (152 and 153) are connected to the other pair of buses CAN2. The ECUs (150, 151, 152, and 153) correspond to CAN FD. The CAN FD as a network protocol speeds up a bit rate of only a data phase with respect to an arbitration phase, and is an extended CAN communication protocol which can transmit data in large quantities.

In the CAN FD, a data transmission is performed in modes called recessive and dominant. In the recessive, a termination circuit sets a potential of the bus pair to be equal, and in the dominant, a transceiver forwards 0 or 1 by causing a potential difference between the buses formed in pair.

In this communication, a message is configured by adding an identifier (called ID) to data or a CRC value to a tail of the data to ensure reliability of the communication, and data to be transmitted are determined according to priority in the arbitration phase in response to a numerical value of the ID. The ID which is the priority of each message, an ECU for transmission, and an ECU for reception are determined at the time of designing the vehicle-mounted network, and the ID is installed in each ECU. Each ECU monitors the electric signal on the bus, acquires the ID during the communication, and specifies the message to be received. Resistors (125 and 126) as termination resistors are connected to the bus CAN1, and a capacitor 129 is connected to a connection portion between the resistor 125 and the resistor 126. In addition, resistors (127 and 128) as the termination resistors are connected to the bus CAN2, and a capacitor 130 is connected to a connection portion between the resistor 127 and the resistor 128.

Figure 1B:
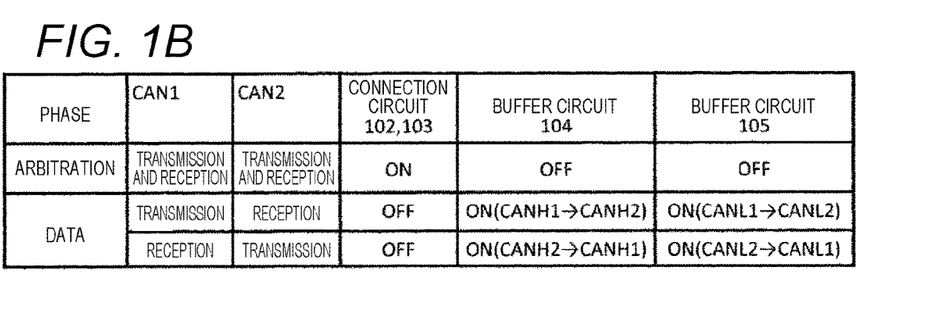
FIG. 1B is a logic table of the relay circuit according to the first embodiment.

FIG. 1B shows an operation logic. In the arbitration phase, the connection circuits (102 and 103) are turned on and the buffer circuits (104 and 105) are turned off. The ECU connected to the bus CAN1 and the ECU connected to the bus CAN2 can each transmit the ID. When the ECU determined to transmit data according to the priority in the arbitration phase is connected to the bus CAN1, the buffer circuit 104 is turned on to transmit the data received from the bus CANH1 to the bus CANH2. In addition, the buffer circuit 105 is also turned on to transmit the data received from the bus CANL1 to the bus CANL2. Meanwhile, when the ECU determined to transmit data according to the priority in the arbitration phase is connected to the bus CAN2, the buffer circuit 104 is turned on to transmit the data received from the bus CANH2 to the bus CANH1. In addition, the buffer circuit 105 is also turned on to transmit the data received from the CANL2 to the bus CANL1.

In other words, a control circuit 110 (controller) turns on the connection circuits 102 and 103 (switches) in the arbitration phase (first period) in which a communication rate of the first signal received from the bus CAN1 (first bus) or the second signal received from the bus CAN2 (second bus) is a first communication rate (for example, 500 kbps), and turns off the connection circuits 102 and 103 in the data phase (second period) in which the communication rate of the first or second signal is a second communication rate (for example, 2 Mbps) larger than the first communication rate.

As a result, in the arbitration phase in which the communication rate is small and the influence of reflections is small, since the bus CAN1 and the bus CAN2 are directly electrically conducted, the signal delays are suppressed. In contrast, the data phase in which the communication rate is large and the influence of reflections is large, since the bus CAN1 and the bus CAN2 are separated and the number of ECUs connected to each bus is small, the signal reflections are suppressed.

As shown in FIG. 5, the arbitration phase (first period) at least includes a period in which an arbitration field which is included in the first signal and the second signal and determines a vehicle-mounted control device transmitting data from a plurality of vehicle-mounted control devices connected to the bus CAN 1 (first bus) and the bus CAN 2 (second bus) is received. As a result, in the arbitration phase, the bus CAN1 and the bus CAN2 are certainly, directly, and electrically conducted.

The control circuit 110 (controller) turns off the buffer circuits 104 and 105 (first and second communication devices) in the arbitration phase (first period), and turns on the buffer circuits 104 and 105 in the data phase (second period). As a result, in the arbitration phase, the signal forwarding processing is not performed in the buffer circuits 104 and 105, and in the data phase, the signal forwarding processing is performed.

In detail, the data phase (second period) at least includes a period in which data fields included in the first signal and the second signal are received.

By the above operation, in the arbitration phase, four ECUs are connected to a pair of buses and thus the priority in the four ECUs is determined. Although the bus scale is large, communication is possible because of being operated at 500 Mbps. In the phase in which data are transmitted, the bus is divided and thus the bus scale becomes smaller, such that the respective bus reflections decrease and communication can be made at 2 Mbps.

It should be noted that the control circuit (controller) is configured to include a processor such as a central processing unit (CPU), a storage device such as a memory, and the like.

Second Embodiment

Figure 3A:
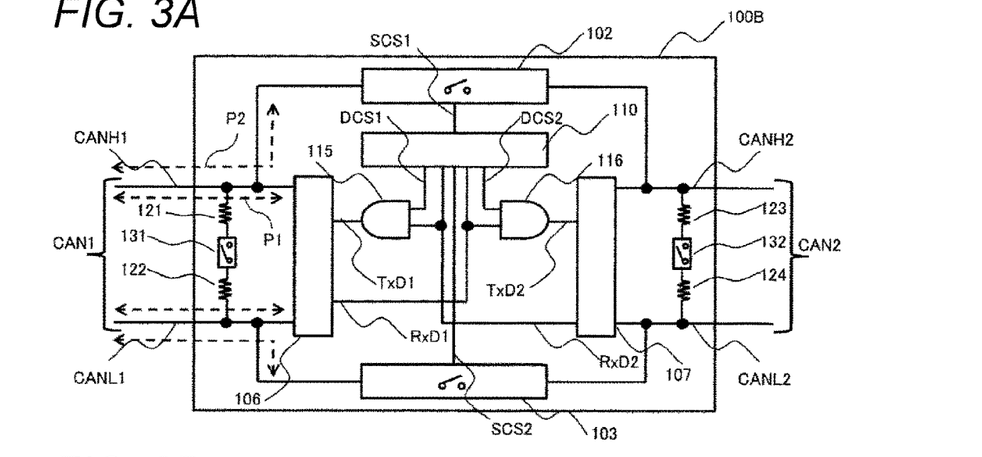
FIG. 3A is a block diagram of a relay circuit according to a second embodiment.

According to a second embodiment, a relay circuit 100B to which two pairs of buses (CAN1 and CAN2) shown in FIG. 3A are connected is configured. A pair of buses CAN1 is configured to include two buses (CANH1 and CANL1) and the other pair of buses CAN2 is configured to include two buses (CANH2 and CANL2). The connection circuit 102 and a driver circuit 106 are connected to the bus CANH1. The connection circuit 103 and the driver circuit 106 such as the transceiver are connected to the bus CANL1. The connection circuit 102 and a driver circuit 107 such as the transceiver are connected to the bus CANH2. The connection circuit 103 and the driver circuit 107 are connected to the bus CANL2. Resistors (121 and 122) as the termination resistors are connected to the buses (CANH1 and CANL1), and a switch circuit 131 is connected to a connection portion between the resistors 121 and 122. Resistors (123 and 124) as the termination resistors are connected to the buses (CANH2 and CANL2), and a switch circuit 132 is connected to a connection portion between the resistors 123 and 124.

Data signals (RxD1 and RxD2) are input to the control circuit 110, and control signals (SCS1, SCS2, DCS1, and DCS2) are output. The data signal RxD1 is an output signal of the driver circuit 106, and the data signal RxD2 is an output signal of the driver circuit 107. The control signal SCS1 is a signal which controls the connection circuit 102, and the control signal SCS2 is a signal which controls the connection circuit 103. The logic circuit 115 takes a logical product of the control signal DCS1 and the data signal RxD2 and outputs the data signal TxD1 to the driver circuit 106. A logic circuit 116 takes a logical product of the control signal DCS2 and the data signal RxD1 and outputs the data signal TxD2 to the driver circuit 107.

In other words, as shown in FIG. 3A, the signal processing and forwarding pathway P1 includes the buffer first communication device which transmits the output signal generated based on the first signal received from the bus CAN1 (first bus) to the bus CAN2 (second bus). In addition, the signal processing and forwarding pathway P1 includes the second communication device which transmits the output signal generated based on the second signal received from the bus CAN2 (second bus) to the bus CAN1 (first bus).

In the present embodiment, the first communication device is configured to include the driver circuit 106, the logic circuit 116, and the driver circuit 107. The second communication device is configured to include the driver circuit 107, the logic circuit 115, and the driver circuit 106.

Figure 3B:
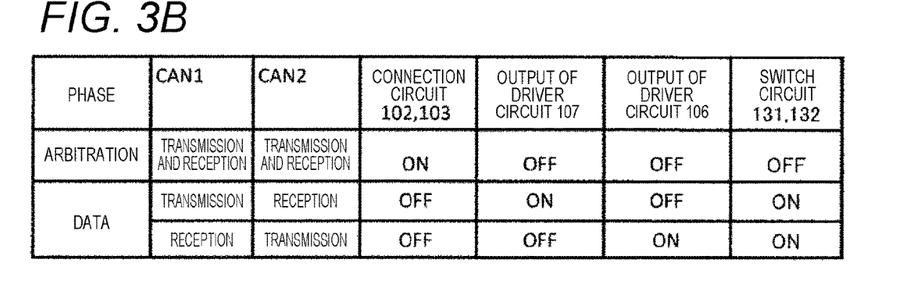
FIG. 3B is a logic table of the relay circuit according to the second embodiment.

FIG. 3B shows an operation logic of FIG. 3A. In the arbitration phase, the connection circuits (102 and 103) are turned on and the driver circuits (106 and 107) are turned off. The ECUs are connected to the bus pair CAN1 and the bus pair CAN2, respectively, to be able to transmit the IDs. When the ECU determined to transmit data according to the priority in the arbitration phase is connected to the bus pair CAN1, the driver circuit 107 is turned on to transmit the data received from the bus pair CAN1 to the bus pair CAN2. Meanwhile, when the ECU determined to transmit data according to the priority in the arbitration phase is connected to the bus CAN2, the driver circuit 106 is turned on to transmit the data received from the bus CAN2 to the bus CAN1.

Figure 3C:
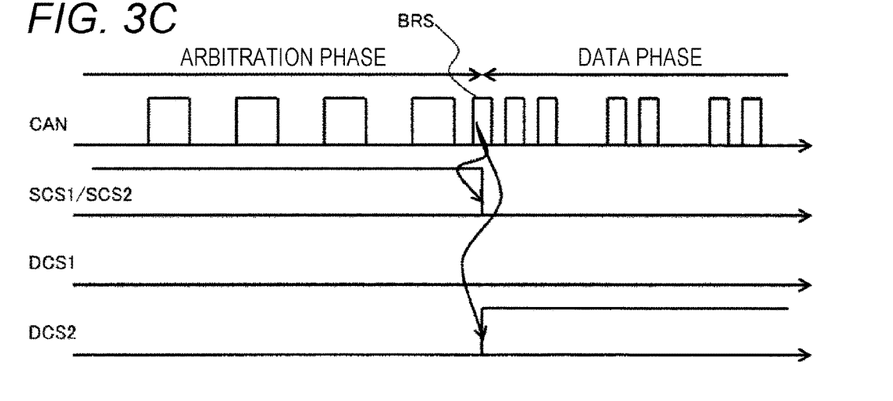
FIG. 3C is a diagram showing operation waveforms of the relay circuit according to the second embodiment.

FIG. 3C shows the operation waveforms. When the arbitration phase is shifted to the data phase, a bit rate switch (BRS) bit is detected and the control signals (SCS1 and SCS2) are shifted from a high level to a low level. As a result, the connection circuits (102 and 103) are turned off. In addition, the control signal DCS1 or DSC2 is shifted from a low level to a high level at the same timing, and the driver circuit 106 or 107 is turned on.

In other words, a time of commencement of the data phase (second period) is timing at which the BRS bit which is included in the first signal and the second signal and indicates that the communication rate is increased is received.

In the present embodiment, the resistor 121, the switch circuit 131, and the resistor 122 connected in series configure a first termination resistor device, and the resistor 123, the switch circuit 132, and the resistor 124 connected in series configure a second termination resistor device. The control circuit 110 (controller) turns off the first and second termination resistor devices in the arbitration phase (first period), and turns on the first and second termination resistor devices in the data phase (second period).

As a result, an impedance of the data phase having a large communication rate and a large reflection can be larger than that of the arbitration phase. As a result, it is possible to further suppress the signal reflections of the data phase.

By this operation, in the arbitration phase, the bus pairs CAN1 and CAN2 are connected and the priority in all the ECUs connected to the respective bus pairs is determined. Although the bus scale is large, communication is possible because of being operated at 500 Mbps. In the phase in which data are transmitted, the bus is divided and thus the bus scale becomes smaller, such that the respective bus reflections decrease and communication can be made at 2 Mbps.

Third Embodiment

Figure 4A:
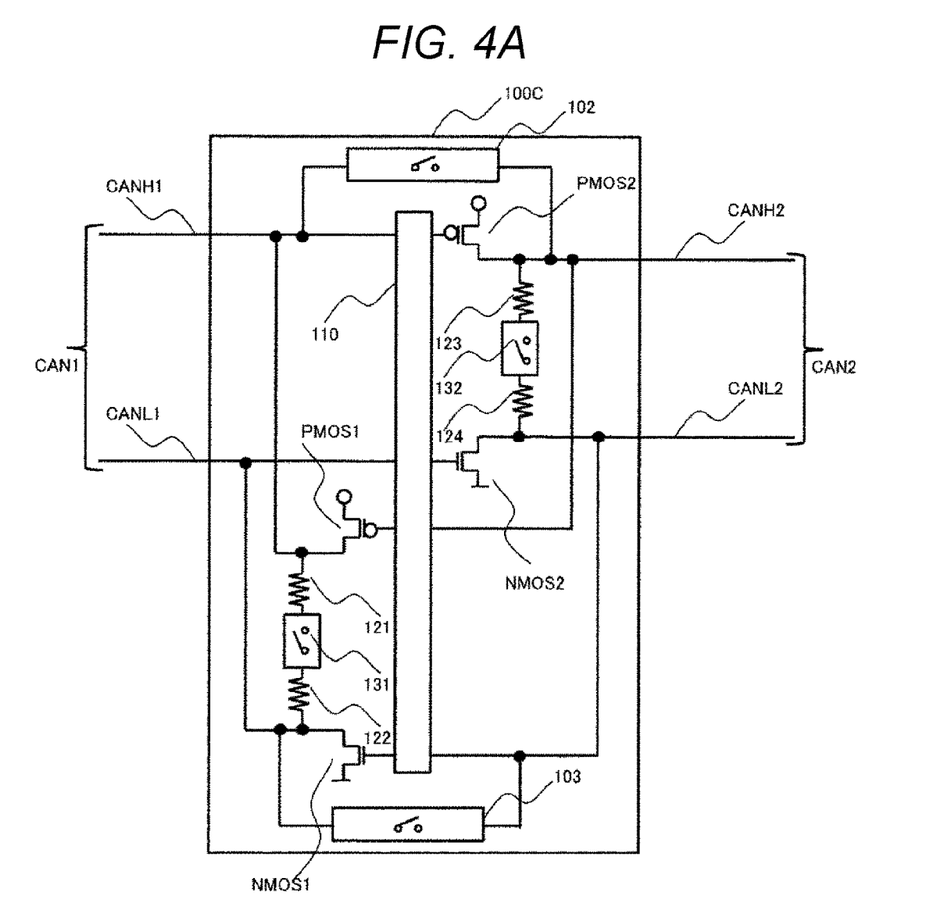
FIG. 4A is a block diagram of a relay circuit according to a third embodiment.

According to a third embodiment, a relay circuit 100C to which two pairs of buses (CAN1 and CAN2) shown in FIG. 4A are connected is configured. A pair of buses CAN1 is configured to include two buses (CANH1 and CANL1) and the other pair of buses CAN2 is configured to include two buses (CANH2 and CANL2). The connection circuit 102 and a control circuit 110 are connected to the bus CANH1. The connection circuit 103 and the control circuit 110 are connected to the bus CANL1. The connection circuit 102 and the control circuit 110 are connected to the bus CANH2. The connection circuit 103 and the control circuit 110 are connected to the bus CANL2. The resistors (121 and 122) as the termination resistors are connected to the buses (CANH1 and CANL1), and the switch circuit 131 is connected to the connection portion between the resistors 121 and 122. The resistors (123 and 124) as the termination resistors are connected to the buses (CANH2 and CANL2), and the switch circuit 132 is connected to the connection portion between the resistors 123 and 124.

Figure 4B:
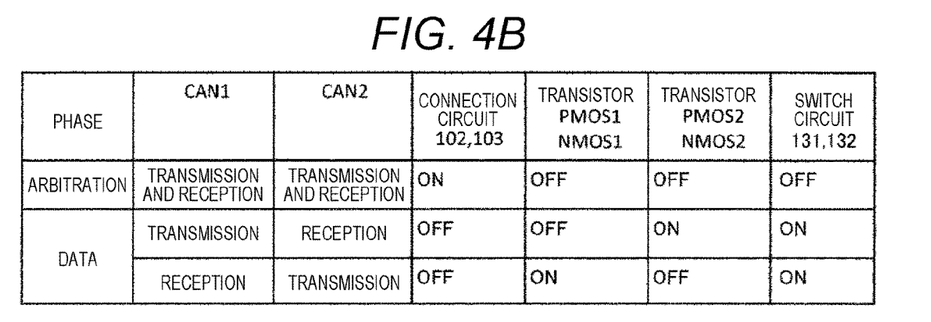
FIG. 4B is a logic table of the relay circuit according to the third embodiment.

The control circuit 110 receives the data of the bus CANH1 and drives a transistor PMOS2. In addition, the control circuit 110 receives the data of the bus CANL1 and drives a transistor NMOS2. In addition, the control circuit 110 receives the data of the bus CANH2 and drives a transistor PMOS1. In addition, the control circuit 110 receives the data of the bus CANL2 and drives a transistor NMOS1. FIG. 4B shows an operation logic of FIG. 4A. In the arbitration phase, the connection circuits (102 and 103) are turned on and the transistors (PMOS1, NMOS1, PMOS2, and NMOS2) are turned off. The ECUs are connected to the bus pair CAN1 and the bus pair CAN2, respectively, to be able to transmit IDs. When the ECU determined to transmit data according to the priority in the arbitration phase is connected to the bus pair CAN1, the transistors PMOS2 and NMOS2 are turned on depending on the data to be transmitted. In addition, the switch circuit 132 is also turned on to activate the termination function. When the ECU determined to transmit data according to the priority in the arbitration phase is connected to the bus pair CAN2, the transistors PMOS1 and NMOS1 are turned on depending on the data to be transmitted. In addition, the switch circuit 131 is also turned on to activate the termination function.

By this operation, in the arbitration phase, the bus pairs CAN1 and CAN2 are connected and the priority in all the ECUs connected to the respective bus pairs is determined. Although the bus scale is large, communication is possible because of being operated at 500 Mbps. In the phase in which data are transmitted, the bus is divided and thus the bus scale becomes smaller, such that the respective bus reflections decrease and communication can be made at 2 Mbps.

It should be noted that the present invention is not limited to the above-described embodiments, but includes various modifications. For example, the above-described embodiments have been described in detail in order to explain the present invention in an easy-to-understand manner, and the present invention is not necessarily limited to the embodiments including all the components described above. In addition, it is possible to substitute some of components of any embodiment into components of other embodiments and it is possible to add components of other embodiments to components of any embodiment. In addition, it is possible to add, delete, or replace other components with respect to some of components of each embodiment.

For example, the relay device may be a dedicated device, or the ECU as the gateway ECU may have the same configuration as the relay device.

In addition, some or all of the respective configurations, functions, and the like which are described above may be designed as, for example, integrated circuits or the like to be implemented in hardware. Information such as programs, tables, and files which realizes each function can be stored in recording media such as a memory.

It should be noted that this embodiment may be the following aspect.

(1) A relay device which relays a plurality of buses to which a plurality of vehicle-mounted processing devices are connected includes: a signal processing and forwarding pathway which processes a signal received from one of the plurality of buses and forwards the signal to another bus; and a bypass connection pathway which connects the one bus to the other bus, bypassing the signal processing and forwarding pathway.

(2) In the relay device according to (1), the vehicle-mounted processing device is configured to transmit data after performing arbitration, and the respective buses are connected to each other by the bypass connection pathway when the vehicle-mounted processing device transmits an arbitration signal and the respective buses are connected to each other by the signal processing and forwarding pathway when the vehicle-mounted processing device transmits the data.

(3) An electronic control unit includes the relay device according to (2).

(4) A vehicle-mounted network system includes a plurality of buses to which a plurality of vehicle-mounted processing devices are connected, with the plurality of buses being connected by a relay circuit, wherein the vehicle-mounted processing device is configured to transmit data after performing arbitration, a transmission rate of the data is set to be faster than that of a signal transmitted at the time of the arbitration, and the relay includes a first pathway through which one signal of the respective buses is directly connected to another bus and a second pathway through which a signal received from one of the respective buses is transmitted to another bus.

(5) In the system according to (4), the relay circuit connects the plurality of buses through the first pathway when the vehicle-mounted processing device transmits an arbitration signal, and the relay circuit connects the plurality of buses through the second pathway when the vehicle-mounted processing device transmits the data.

(6) In the system according to (5), the plurality of buses are connected in low impedance when the vehicle-mounted processing device transmits the arbitration signal, and the plurality of buses are connected in impedance higher than the impedance when the vehicle-mounted processing device transmits the data.

REFERENCE SIGNS LIST 100A, 100B, 100C relay circuit
102, 103 connection circuit
104, 105 buffer circuit
110 control circuit
121, 122, 123, 124, 125, 126, 127, 128 resistor
131, 132 switch circuit
129, 130 capacitor (capacitance)
150, 151, 152, 153 ECU
106, 107 driver circuit
115, 116 logic circuit
201 CAN starts to receive
202 recognize CAN ID
203 is frequency switched? (BRS=1?)
204 buffer: ON, switch: OFF
205 transmit data
206 buffer: OFF, switch: ON
207 receive ACK
208 end
209 transmit data

The invention claimed is:
1. A relay device which relays a plurality of buses to which a plurality of vehicle-mounted processing devices are connected, comprising:

a signal processing and forwarding pathway which processes a signal received from one of the plurality of buses and forwards the signal to another bus,
wherein the plurality of buses include at least a first bus and a second bus, and
wherein the signal processing and forwarding pathway includes:
a first communication device which transmits an output signal generated based on a first signal received from the first bus to the second bus, and
a second communication device which transmits an output signal generated based on a second signal received from the second bus to the first bus;
a bypass connection pathway which connects the one bus to the other bus, bypassing the signal processing and forwarding pathway, wherein the bypass connection pathway includes a switch, one end of the switch being connected to the first bus and the other end of the switch being connected to the second bus; and
a controller which turns on the switch in a first period in which a communication rate of the first or second signal is a first communication rate and turns off the switch in a second period in which the communication rate of the first or second signal is a second communication rate, wherein the second communication rate is higher than the first communication rate.

2. The relay device according to claim 1, wherein the first period at least includes a period in which an arbitration field which is included in the first signal and the second signal and determines the vehicle-mounted control device transmitting data from the plurality of vehicle-mounted control devices connected to the first and second buses is received.

3. The relay device according to claim 1, wherein the controller turns off the first and second communication devices in the first period, and turns on the first and second communication devices in the second period.

4. The relay device according to claim 1, wherein the second period at least includes a period in which a data field included in the first signal and the second signal is received.

5. The relay device according to claim 1, wherein a time of commencement of the second period is timing at which a bit which is included in the first signal and the second signal and indicates that the communication rate is increased is received.

6. The relay device according to claim 1 further comprising:
a first termination resistor device which is connected to the first bus; and
a second termination resistor device which is connected to the second bus,
wherein the controller
turns off the first and second termination resistor devices in the first period, and
turns on the first and second termination resistor devices in the second period.

7. An electronic control device comprising the relay device according to claim 1.

8. The relay device according to claim 1, wherein the first communication device and the second communication device are integrally configured.

9. A vehicle-mounted network system, comprising:
a plurality of vehicle-mounted control devices; and
a relay device relaying a plurality of buses to which the plurality of vehicle-mounted processing devices are connected,
wherein the relay device includes:
a signal processing and forwarding pathway which processes a signal received from one of the plurality of buses and forwards the signal to another bus,
wherein the plurality of buses include at least a first bus and a second bus, and
wherein the signal processing and forwarding pathway includes:
a first communication device which transmits an output signal generated based on a first signal received from the first bus to the second bus, and
a second communication device which transmits an output signal generated based on a second signal received from the second bus to the first bus;
a bypass connection pathway which connects the one bus to the other bus, bypassing the signal processing and forwarding pathway, wherein the bypass connection pathway includes a switch, one end of the switch being connected to the first bus and the other end of the switch being connected to the second bus; and
a controller which turns on the switch in a first period in which a communication rate of the first or second signal is a first communication rate and turns off the switch in a second period in which the communication rate of the first or second signal is a second communication rate, wherein the second communication rate is higher than the first communication rate.

* * * * *